(12) United States Patent
Kim et al.

(10) Patent No.: US 8,951,659 B2
(45) Date of Patent: Feb. 10, 2015

(54) BARRIER AND BATTERY MODULE HAVING THE SAME

(75) Inventors: Tae-Yong Kim, Yongin-si (KR); Hong-Sup Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1662 days.

(21) Appl. No.: 11/605,469

(22) Filed: Nov. 29, 2006

(65) Prior Publication Data

US 2007/0122695 A1 May 31, 2007

(30) Foreign Application Priority Data

Nov. 30, 2005 (KR) .......................... 10-2005-115613

(51) Int. Cl.
| | |
|---|---|
| *H01M 6/46* | (2006.01) |
| *H01M 2/10* | (2006.01) |
| *H01M 10/613* | (2014.01) |
| *H01M 10/647* | (2014.01) |
| *H01M 10/6551* | (2014.01) |
| *H01M 10/6555* | (2014.01) |
| *H01M 10/6557* | (2014.01) |
| *H01M 10/6563* | (2014.01) |

(52) U.S. Cl.
CPC .......... *H01M 2/1016* (2013.01); *H01M 2/1077* (2013.01); *H01M 6/46* (2013.01); *H01M 10/5004* (2013.01); *H01M 10/5032* (2013.01); *H01M 10/5046* (2013.01); *H01M 10/5055* (2013.01); *H01M 10/5059* (2013.01); *H01M 10/5067* (2013.01)
USPC ...................................... 429/152

(58) Field of Classification Search
CPC ... H01M 2/24; H01M 2/1016; H01M 2/1077; H01M 6/46

USPC ......... 429/129, 142–144, 147–148, 177–179, 429/71–72, 96–100, 120, 151–154, 429/156–163, 186, 208, 210, 246; 29/623.1–623.5

See application file for complete search history.

(56) References Cited

U.S. PATENT DOCUMENTS

| | | | | |
|---|---|---|---|---|
| 2,906,804 | A | * | 9/1959 | Rigsby, Sr. ..................... 429/160 |
| 4,246,325 | A | * | 1/1981 | Hatch .............................. 429/50 |

(Continued)

FOREIGN PATENT DOCUMENTS

| | | | | | |
|---|---|---|---|---|---|
| JP | 08321329 | A | * | 12/1996 | ............ H01M 10/50 |
| JP | 2001023702 | A | * | 1/2001 | ............ H01M 10/50 |
| JP | 2003007355 | A | * | 1/2003 | ............ H01M 10/50 |

OTHER PUBLICATIONS

Machine Translation and Abstract in English of JP 2003-007355.*

(Continued)

*Primary Examiner* — Patrick Ryan
*Assistant Examiner* — Claire L Roe
(74) *Attorney, Agent, or Firm* — Christie, Parker & Hale, LLP

(57) ABSTRACT

A battery module to accurately position a barrier between unit batteries and improve constructability of a battery module, including at least two unit batteries, and at least one barrier interposed between the unit batteries. The barrier includes a pair of panels facing each other and having protrusions on a surface of each panel that faces the other panel, at least one jointing hole formed in each panel, and a locking pin inserted into the jointing hole to combine the pair of panels with each other.

4 Claims, 9 Drawing Sheets

(56) References Cited

U.S. PATENT DOCUMENTS 5,948,560 A * 9/1999 Verhoog et al. ............... 429/160
6,312,851 B1 * 11/2001 Fukuda et al. ............... 429/176

OTHER PUBLICATIONS

Machine Translation and Abstract in English of JP 2001-023702.*
Machine Translation and Abstract in English of JP 08321329.*

* cited by examiner

BARRIER AND BATTERY MODULE HAVING THE SAME

CROSS-REFERENCE TO RELATED APPLICATION

This application claims the benefit of Korean Patent Application No. 2005-115613, filed Nov. 30, 2005 in the Korean Intellectual Property Office, the disclosure of which is incorporated herein by reference.

BACKGROUND OF THE INVENTION

1. Field of the Invention

Aspects of the present invention relate to a barrier and a battery module having the barrier, and, more particularly, to an improved barrier structure interposed between unit batteries and a battery module having an improved barrier structure interposed between unit batteries, by which a manufacturing process may be simplified and an effect of a manufacturing defect may be minimized.

2. Description of the Related Art

A battery module includes a few or several tens of connected rechargeable batteries. The rechargeable battery may be repeatedly charged and discharged because chemical and electrical energy conversion thereof is reversible. While a low capacity battery is used in portable miniaturized electronic devices (e.g., a mobile phone, a laptop computer, and/or a camcorder), a large capacity battery is widely used as a power supply to drive motors of movable electric apparatuses such as a hybrid electric vehicle.

The rechargeable battery may have a variety of shapes and may be cylindrical or rectangular. The large capacity rechargeable battery is constructed by connecting a plurality of unit batteries in series in order to allow the rechargeable battery to be used in large power consuming apparatuses such as the hybrid electric vehicle. As is described above, a single large capacity rechargeable battery (hereinafter, referred to as a battery module) typically includes a plurality of rechargeable batteries (hereinafter, referred to as unit batteries for simplicity of description) connected in series.

Each unit battery includes an electrode assembly having positive and negative electrode plates and a separator interposed therebetween, a casing having a space defined therein to store the electrode assembly, a cap assembly combined with the casing to seal the casing, and positive and negative terminals that protrude from the cap assembly and which are electrically connected with the positive and negative electrode plates of the electrode assembly.

A single battery module is constructed by arranging a plurality of unit batteries along a single line and by connecting positive and negative terminals of neighboring unit batteries to each other using a conductor with engagement tools such as bolts and nuts.

As is described above, since a single battery module is constructed by connecting a few or several tens of unit batteries to each other in series, heat generated from each unit battery should be appropriately discharged. Such a heat sink function is particularly important for a rechargeable battery used in a hybrid electric vehicle.

When the heat is not appropriately sunken, the heat generated from each unit battery may cause an abnormally high temperature in the battery module, and may eventually cause the battery module to malfunction.

Accordingly, when a plurality of unit batteries are used to constitute a battery module, a barrier is provided between the unit batteries to define a space to allow for a circulation of a cooling medium between the unit batteries and to prevent a structural deformation of the unit batteries.

Recently, such a barrier has been constructed by combining a plurality of panels having a plurality of protrusions on each surface of each panel in order to allow for a circulation of a cooling medium and to obtain a sufficient structural integrity.

The aforementioned barrier structure may have some problems, however, with a bonding failure during a process of bonding the pair of panels to provide a single barrier. This bonding failure is generated because appropriately adjusting positions of the pair of panels is difficult. Accordingly, a welding failure between the pair of panels may occur as the positions of the protrusions of the panels deviate from one another.

As a result of the structural failure in the barrier, the cooling medium may be inappropriately circulated, a heat sink characteristic of the battery module may be degraded, the structural integrity of the barrier may be degraded, and the battery lifetime may also be reduced. In addition, since accurately adjusting positions between the barrier and the unit battery in a conventional battery structure is difficult, an assembling failure may also occur.

SUMMARY OF THE INVENTION

Aspects of the present invention provide a barrier and a battery module having the barrier, by which a welding failure between a pair of panels may be prevented.

Aspects of the present invention also provide a barrier and a battery module having the barrier, by which constructability of the battery module may be improved by accurately interposing the barrier between the unit batteries.

According to an aspect of the present invention, there is provided a battery module including: at least two unit batteries; and at least one barrier interposed between the unit batteries, wherein the barrier includes a pair of panels facing each other and having protrusions on a surface of each panel that faces the other panel, at least one jointing hole formed in each panel, and a locking pin inserted into the jointing hole to combine a pair of the panels with each other.

The locking pin may be forcibly inserted into the jointing hole, and a length of the locking pin may correspond with a thickness of the barrier. Accordingly, a pair of panels may be fixed by inserting the locking pin into the jointing hole of each panel.

A pair of the panels of the barrier may be welded to each other while the protrusions of one of the panels are adjoined with protrusions of the other panel. An inner space of the protrusions may be filled or vacant.

The jointing hole may be formed in each corner of each panel of the barrier.

The jointing hole and the corresponding locking pin may have a circular shape, or a polygonal shape such as an elliptical, and a rectangular shape.

A length of the locking pin may be larger than a thickness of the barrier, so that a portion of the locking pin is protruded from an outer surface of the barrier. The unit battery may have a recess on an outer surface in a position corresponding to the locking pin, so that a leading end of the locking pin is inserted into the recess. As a result, positions of the unit battery and the barrier can be accurately adjusted just by inserting the leading end of the locking pin protruded from an outer surface of the barrier into the recess formed in an outer surface of the casing of the unit battery.

According to another aspect of the present invention, there is provided a battery module, including: at least two unit batteries including guide recesses; and at least one barrier interposed between the unit batteries, wherein the barrier has a pair of panels facing each other and having protrusions on a surface of each panel that faces the other panel and a guide formed on each panel and inserted into the guide recesses.

The guide may be formed on a surface opposite to a surface where the protrusions are formed. The guide may be forcibly inserted into the guide recesses. The guide may be formed in a corner of the panel. Needless to say, a position of the jointing hole is not limited to the corner of the panel, and may be formed anywhere on the panel.

According to still another aspect of the present invention, there is provided a barrier of a rechargeable battery, including: a pair of panels having a plurality of protrusions formed on a corresponding surface and facing each other such that protrusions of one of the panels are adjoined to protrusions of the other panel; a jointing hole formed in a corresponding position of each panel; and a locking pin inserted into the jointing hole of each panel to combine the panels with each other.

The locking pin may be forcibly inserted into the jointing hole. A pair of the panels may be bonded using welding. Shapes of the jointing hole and the locking pin may be circular or polygonal. The jointing hole may be formed in a corner of the panel.

A length of the locking pin may correspond with a thickness of the barrier. A length of the locking pin may be larger than a thickness of the barrier, so that a portion of the locking pin is protruded from an outer surface of the barrier.

The protrusions may have a hemispherical shape, a cylindrical shape having a circular or polygonal cross-section or a trapezoidal side section, and a polygonal conical shape such as a circular cone, a triangular cone, and a rectangular cone.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
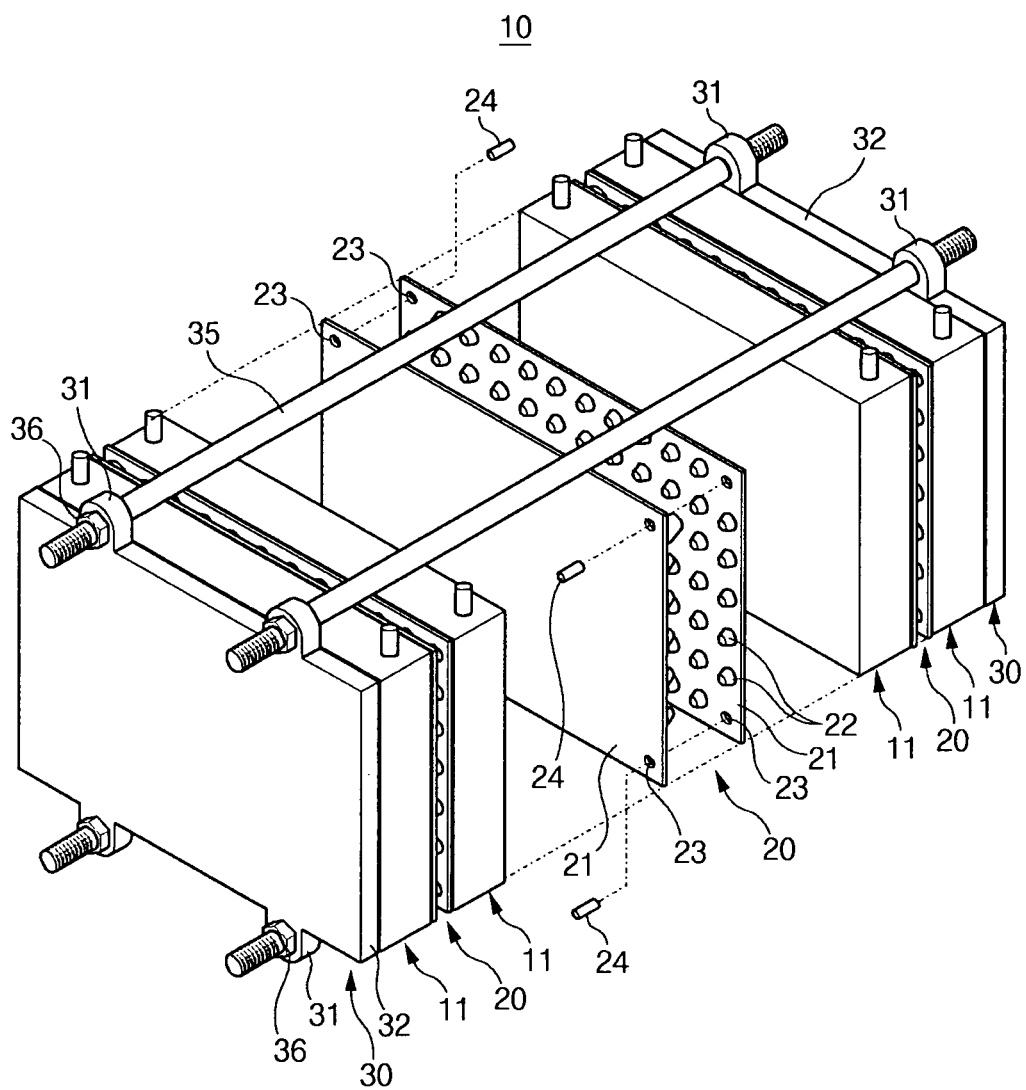
FIG. 1 is an exploded perspective view illustrating a battery module according to a first embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
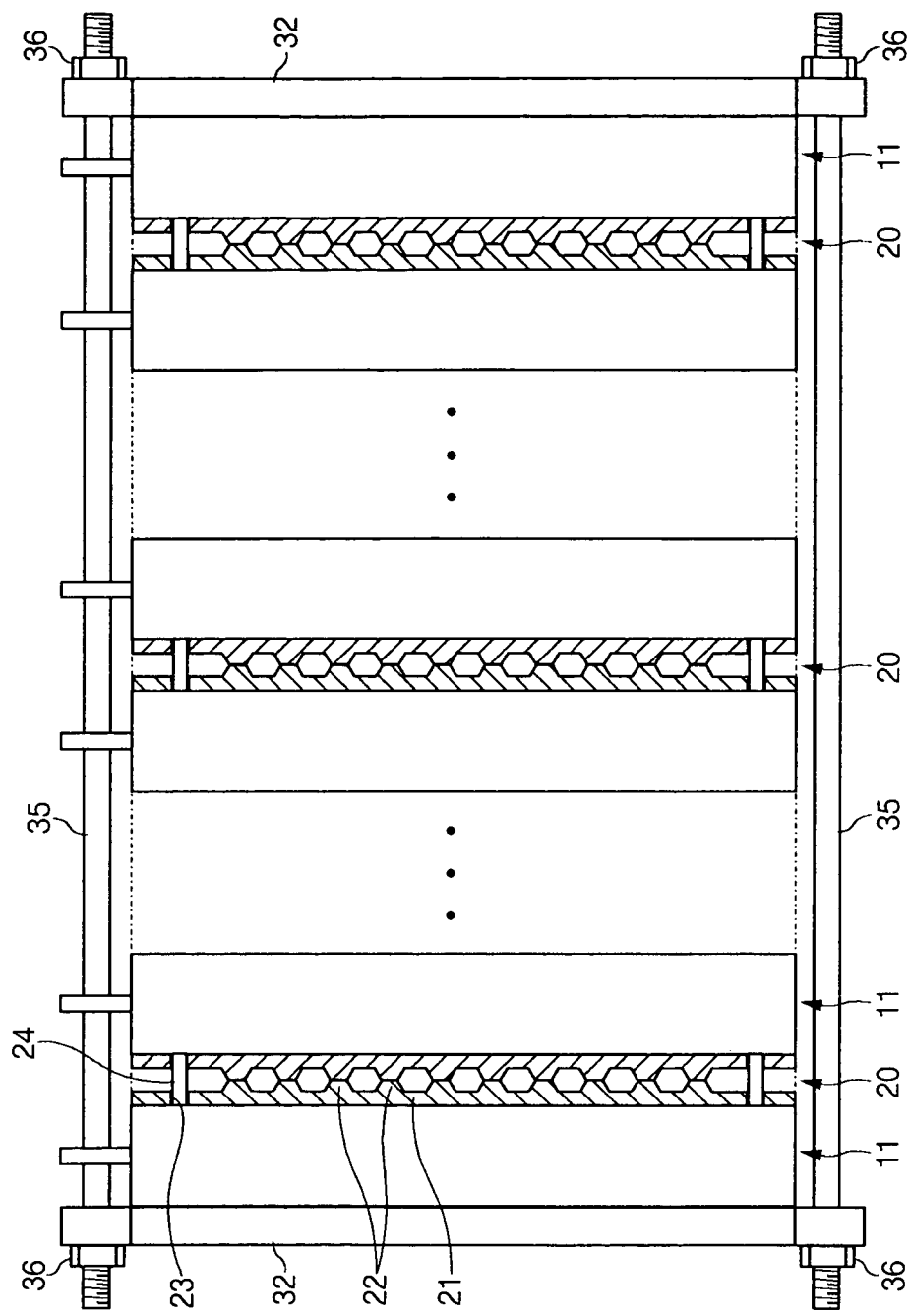
FIG. 2 is a schematic side sectional view illustrating a battery module according to the first embodiment of FIG. 1.

FIG. 1 is an exploded perspective view illustrating a battery module according to an embodiment of the present invention, and FIG. 2 is a schematic side sectional view illustrating the battery module according to the embodiment of FIG. 1. As shown in FIGS. 1 and 2, the battery module 10 includes a plurality of unit batteries 11 arranged in series at a substantially constant interval.

Each unit battery 11 has a structure that is typical for a rechargeable battery. Such structure includes an electrode assembly having positive and negative electrodes and a separator interposed therebetween, and a rectangular casing to store the electrode assembly in which a predetermined amount of electric current is charged and/or discharged. In addition, a barrier 20 is interposed between the unit batteries 11 to allow the unit batteries to be spaced from each other at a predetermined interval and to allow a cooling medium to circulate through the gap between the unit batteries.

According to an embodiment of the invention, a plurality of unit batteries 11 are arranged in series at a constant interval with the barriers 20 being interposed therebetween to constitute a battery assembly.

A pair of end plates 30 are installed on both outer surfaces of the outermost unit batteries 11 of the battery assembly. Connection rods 35 interconnect the pair of end plates 30. Fastening members, such as nuts 36, engaged with leading ends of the connection rods 35 are provided to allow the unit batteries 11 to make close contact with one another in order to obtain a single battery module 10 as shown in FIG. 1. The end plates 30 have a size corresponding to a size of a front face of the unit battery 11 as shown in FIG. 1. Each end plate 30 includes a panel member 32 that makes close contact with the front face of the unit battery and knobs 31 that are integrally formed with top and bottom edges of the panel member 32 and which outwardly protrude therefrom. The connection rods 35 are inserted into holes of the knobs 31, and the nuts 36 are fastened to the threads formed on the leading ends of the connection rods 35. As a result, the end plates 30 disposed at both sides of the battery assembly may be tightened on either side of the unit batteries 11 and the barriers 20 in order to fix the unit batteries 11 and the barrier 20 together.

In the aforementioned battery module 10, the barriers 20, according to an embodiment of the invention, are manufactured by bonding a pair of panels 21 having a size corresponding to the size of the front face of the unit battery 11.

Each panel 21 has a plurality of protrusions 22 that protrude from a surface thereof in a predetermined pattern. Pairs of panels 21 are bonded to each other, such that the protrusions 22 provided on both panels 21 face each other. As a result, a space is provided between the panels 21 of each pair of panels 21. A cooling medium, such as air, can then be circulated through this space.

Figure 3:
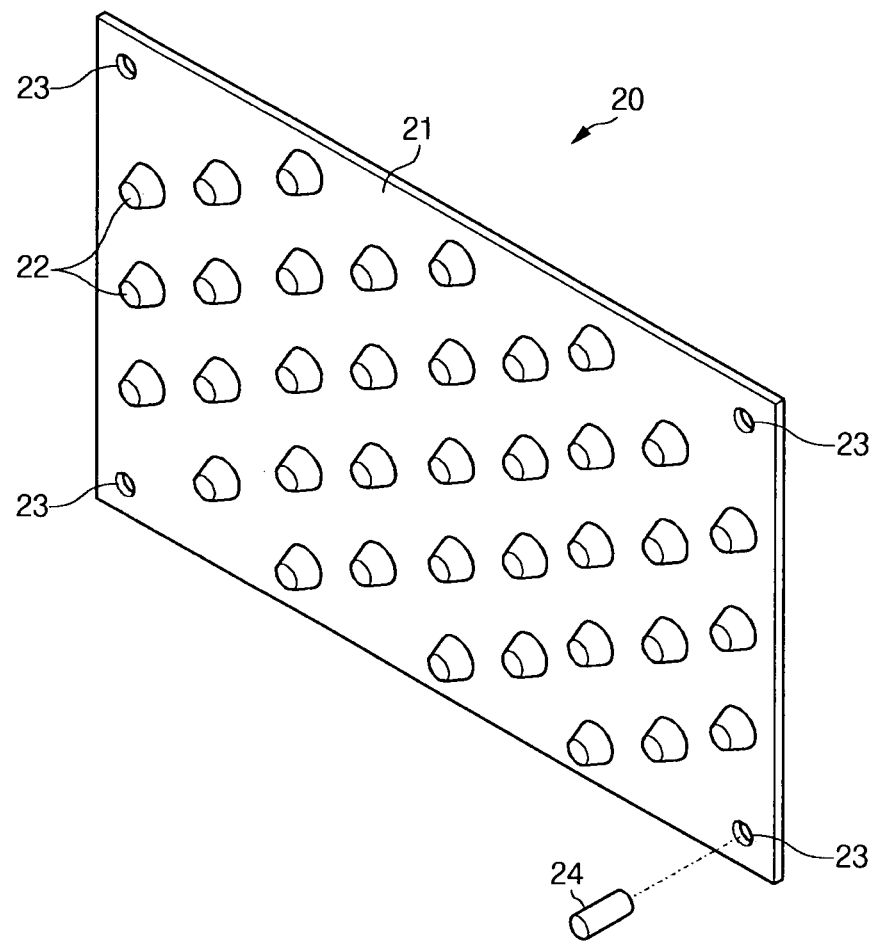
FIG. 3 is a perspective view illustrating a portion of a barrier of a battery module according to the first embodiment of the present invention.

The barrier 20 will now be described in more detail with reference to FIG. 3.

Since all of the panels 21, each of which has protrusions 22 and jointing holes 23, have similar structures and shapes, according to an embodiment of the present embodiment, only a single panel 21 will be described.

A plurality of protrusions 22 protrude from a surface of the panel 21 at a substantially constant interval. Each corner of the panel 21 has a circular jointing hole 23 defined therein into which a locking pin 24 is inserted.

Figure 4:
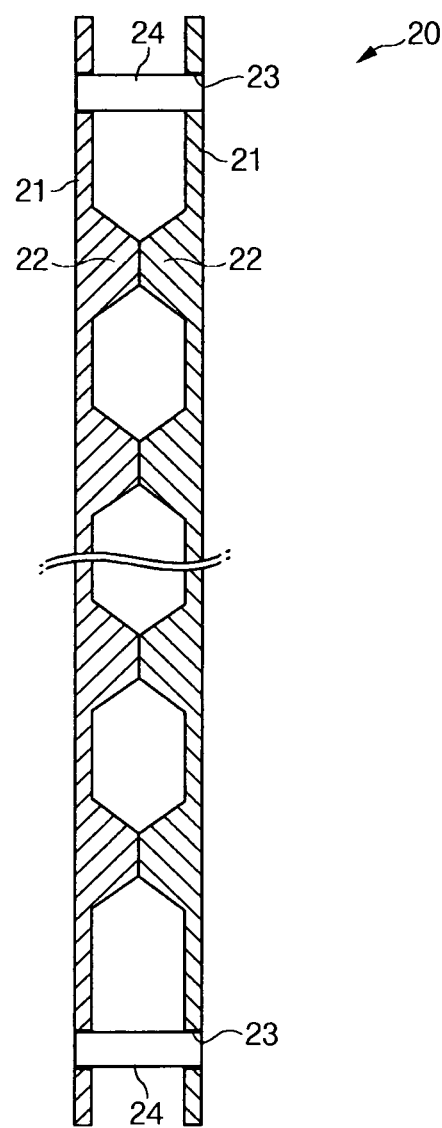
FIG. 4 is a cross-sectional view illustrating a state that a barrier of a battery module is assembled according to the first embodiment of the present invention.

The locking pin 24, inserted into the jointing hole 23 has a circular cross-section similar to that of the jointing hole 23 and a diameter slightly larger than that of the jointing hole 23, so that the locking pin 24 is held securely when the locking pin 24 is forcibly inserted into the jointing hole. As shown in FIG. 4, the pairs of panels 21 are assembled with each other by the forcible insertion of the locking pin 24 into the jointing holes 23 of each panel.

In addition, a length of the locking pin 24 corresponds to a thickness of the barrier 20 when the pair of the panels 21 are assembled as shown in FIG. 2. This allows the barrier 20 to be in relatively tight contact with the unit battery while the locking pin 24 is inserted into the jointing hole 23.

In order to increase a coherence of the pair of panels 21, adjoining surfaces of both panels 21 are bonded to each other using ultrasonic welding once the locking pins 24 are inserted into the jointing holes 23. As a result, both panels 21 may be bonded together more strongly.

Figure 5:
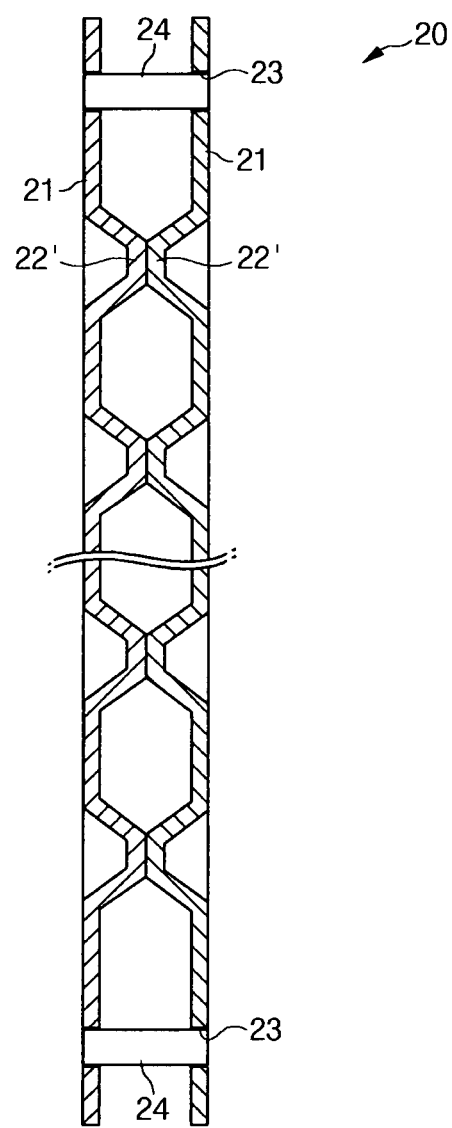
FIG. 5 is a cross-sectional view illustrating a state that a barrier of a battery module is assembled according to a second embodiment of the present invention.

According to an embodiment of the present embodiment, an inner space of the protrusions is filled with a material that is substantially similar to that of the panel 21 as shown in FIG. 4. On the contrary, according to the second embodiment of the present invention, the inner space of the protrusions 22' can be vacant as shown in FIG. 5. As a result, the pairs of the panels 21 may be readily combined and their positions may be adjusted as needed by simply bonding both panels using the locking pins 24.

Although not shown in the drawings, the shape of the protrusions 22 may be hemispherical, cylindrical, or cubic in addition to that the shapes described for the protrusions that are discussed above. Alternatively, the shape of the protrusions 22 may be a polygonal cone such as a circular cone, a triangular cone, and a rectangular cone. Similarly, although not shown in the drawings, the shapes of the jointing holes 23 and the locking pins 24 are not limited those shown in the drawings, and may be a polygonal shape such as an elliptical or rectangular shape in addition to a circular shape.

Figure 6:
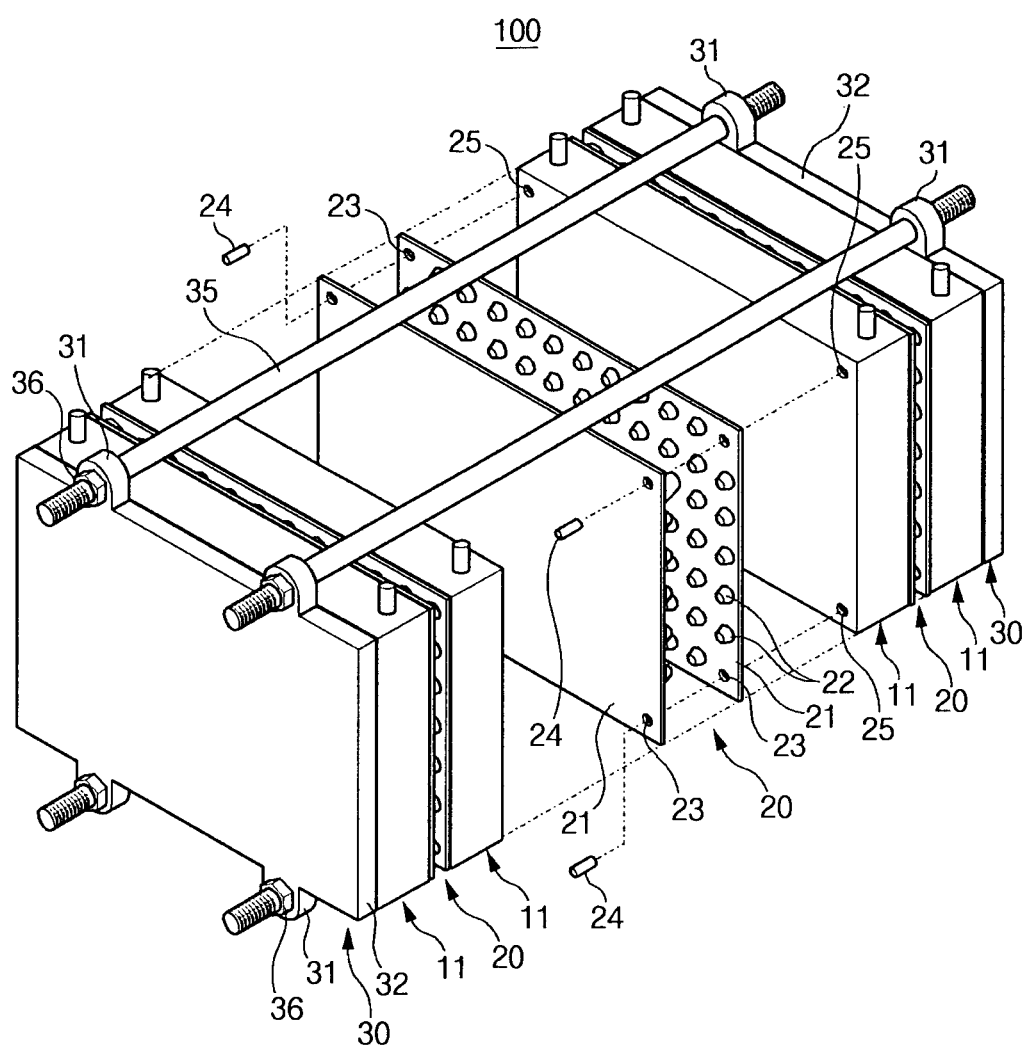
FIG. 6 is an exploded perspective view illustrating a battery module according to a third embodiment of the present invention.
Figure 7:
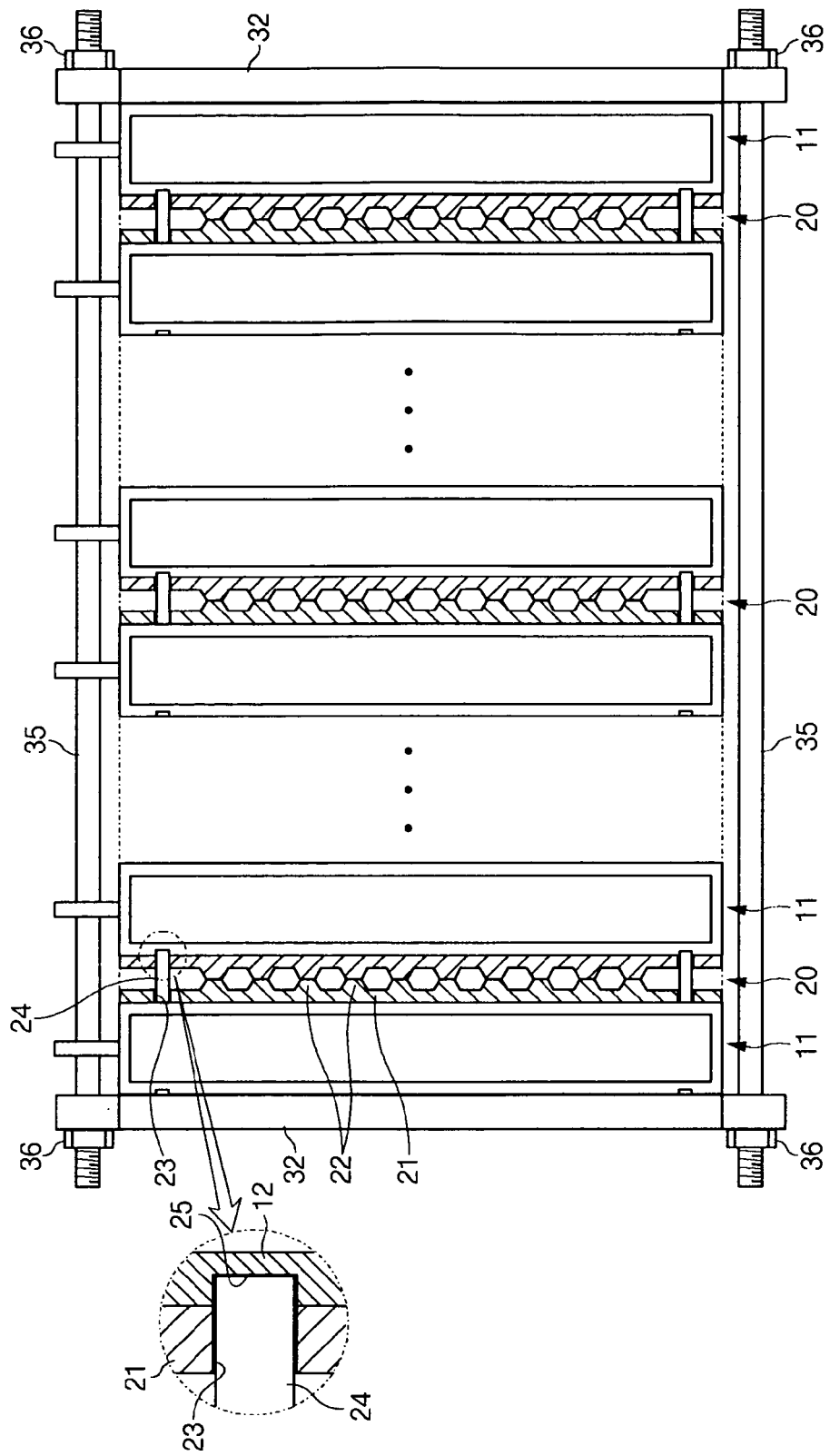
FIG. 7 is a side sectional view illustrating a battery module according to the third embodiment of the present invention.

FIGS. 6 and 7 illustrate a battery module 100 according to the third embodiment of the present invention. As shown in FIGS. 6 and 7, each barrier 20 is interposed between the unit batteries 11, and a plurality of the unit batteries 11 and the barriers 20 are arranged in series to constitute a single battery assembly. The barriers 20 allow the unit batteries to be spaced from one another at a predetermined interval and allow a cooling medium to circulate through gaps between the unit batteries.

The barrier 20 includes a pair of panels 21 that face each other. The plurality of protrusions 22 protruded on a surface of each panel 21 in a substantially constant pattern. Each corner of the panel 21 has a jointing hole 23 that extends through a thickness thereof. Both panels 21 are combined with each other through locking pins 24 that are inserted into each jointing hole 23.

The locking pins 24 each have a diameter that is slightly larger than that of the jointing holes 23, so that the locking pins 24 secure the panels 21 to each other once the locking pins 24 are forcibly inserted into the jointing holes 23. Also, the length of the locking pins 24 is slightly larger than the thickness of the barriers 20. As such, a portion of the locking pins 24 protrudes from the outer surface of the barriers 20. Recesses 25 are provided on a front surface of a casing 12 of each unit battery 11 facing the barriers 20. The portion of each locking pin 24 that protrudes from the barriers 20 is inserted into the recesses 25.

Accordingly, when the locking pins 24 are inserted into the jointing holes 23 of each panel 21 to combine a pair of the panels 21 with each other, the panels 21 are combined to constitute a single barrier 20. Since the length of the locking pins 24 is slightly larger than the thickness of the barriers 20, a portion of each locking pin 24 protrudes from an outer surface of the panels 21. As a result, positions of the unit batteries and the barriers 20 may be adjusted accurately simply by an insertion of the leading ends of the locking pins 24 into the recesses 25 formed in an outer surface of the casings of the unit batteries 11. Since the leading end of each locking pin 24 is inserted into a recess 25 of the casings 12 of the unit batteries 11, the barriers 20 are able to relatively tightly contact the unit batteries 11 even when portions of the locking pins 24 are projected.

Figure 8:
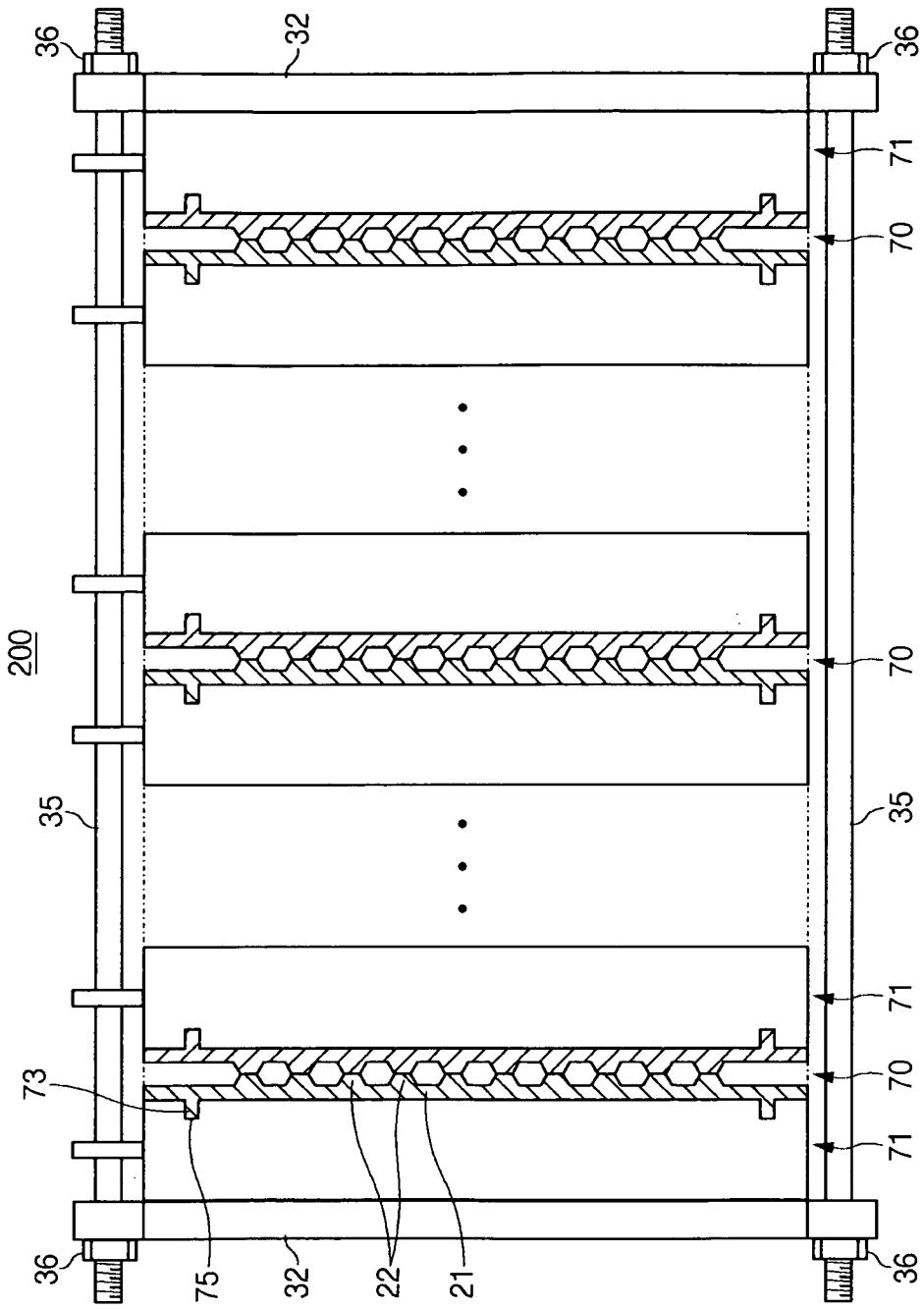
FIG. 8 is a side sectional view illustrating a battery module according to a fourth embodiment of the present invention.
Figure 9:
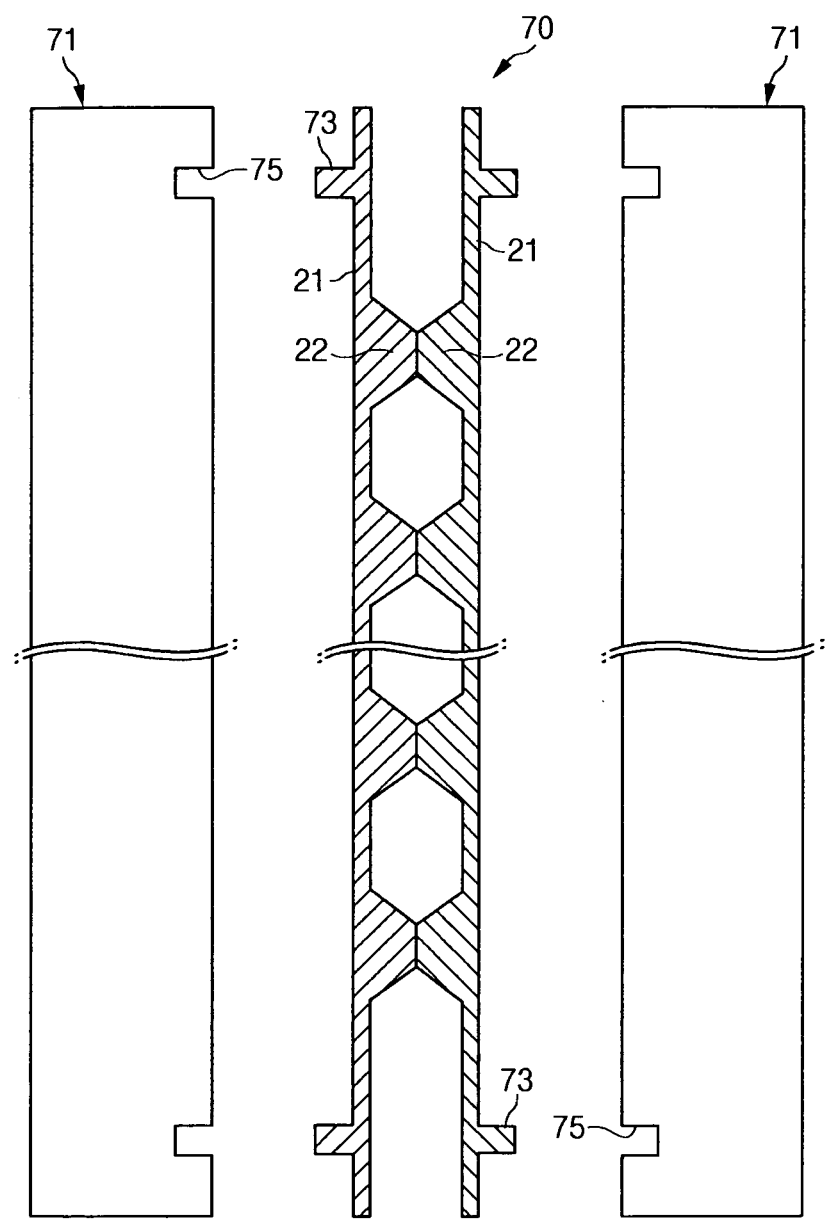
FIG. 9 is a cross-sectional view illustrating a barrier and a unit battery shown in FIG. 8.

FIG. 8 is a side sectional view illustrating a battery module 200 according to another embodiment of the present invention, and FIG. 9 is a cross-sectional view illustrating a unit battery 71 and a barrier 70 shown in FIG. 8.

A barrier 70, interposed between unit batteries 71, includes a pair of panels 21 facing each other each having protrusions 22 on a surface thereof that faces the other panel 21. Each panel 21 also includes a guide 73 formed two or more corners of the panel 21 on a surface opposite to the surface where the protrusions 22 are formed. Each unit battery 71 has guide recesses 75 into which the guides 73 are inserted. The guides 73 are forcibly inserted into the guide recesses 75. The shapes of the guides 73 and the guide recesses 75 may circular or polygonal, and the present invention is not limited thereto. As a result, conveniently and accurately adjusting positions of the barriers 70 and the unit batteries 71 is possible just by inserting the guides 73 of the barriers 70 into the guide recesses 75 formed in the unit batteries 71.

According to aspects of the present invention, improving a constructability of a pair of panels forming the above-described barrier and minimizing a bonding failure of the barrier is possible. Therefore, readily manufacturing the barriers is also possible. In addition, conveniently adjusting positions of the unit batteries and the barriers to improve the constructability of a battery module is possible. Accordingly, prevention of deformation of the unit batteries and improving heat exchange efficiency of the barriers are also possible.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A battery module comprising:
   at least two unit batteries, each of the at least two unit batteries comprising a case having a side face, wherein the at least two unit batteries are entirely spaced from each other;
   at least one barrier between the at least two unit batteries, wherein the at least one barrier comprises a pair of panels facing each other and having protrusions on a surface of each of the pair of panels, wherein respective protrusions of a first and second one of the pair of panels face each other to define openings therebetween and wherein each of the pair of panels covers an entire side face of one of the at least two unit batteries, at least one jointing hole in each of the pair of panels, and a locking pin in the at least one jointing hole to combine the pair of panels with each other, wherein the locking pin has a substantially constant cross-section along a length of the locking pin;

a pair of end plates located at opposing ends of the at least two unit batteries and coupled together by a connection rod, wherein a length of the locking pin is larger than a thickness of the barrier, such that a portion of the locking pin protrudes from an outer surface of the barrier; and wherein each of the at least two unit batteries comprises a recess on an outer surface thereof in a position corresponding to that of the locking pin, such that a leading end of the locking pin is within the recess.

2. The battery module according to claim 1, wherein the pair of panels are attached to each other using welding.

3. The battery module according to claim 1, wherein the at least one jointing hole and the locking pin are circular or polygonal.

4. The battery module according to claim 1, wherein the at least one jointing hole is adjacent a corner of the panel.

* * * * *